(12) United States Patent
Hahn et al.

(10) Patent No.: US 7,655,342 B2
(45) Date of Patent: Feb. 2, 2010

(54) PROTON-CONDUCTING POLYMER MEMBRANE AND METHOD FOR THE PRODUCTION THEREOF TO SIMULTANEOUSLY REMOVE THE CATALYST LAYERS

(75) Inventors: Robert Hahn, Berlin (DE); Stefan Wagner, Berlin (DE); Andreas Schmitz, Freiburg (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 966 days.

(21) Appl. No.: 10/515,223

(22) PCT Filed: May 20, 2003

(86) PCT No.: PCT/EP03/05304

§ 371 (c)(1),
(2), (4) Date: Jun. 3, 2005

(87) PCT Pub. No.: WO03/100882

PCT Pub. Date: Dec. 4, 2003

(65) Prior Publication Data

US 2005/0208354 A1 Sep. 22, 2005

(30) Foreign Application Priority Data

May 29, 2002 (DE) ................................ 102 24 452

(51) Int. Cl.
*H01M 4/00* (2006.01)
*H01M 8/10* (2006.01)

(52) U.S. Cl. .................. 429/40; 429/30; 429/32; 427/115

(58) Field of Classification Search .............. None
See application file for complete search history.

(56) References Cited

U.S. PATENT DOCUMENTS

| | | | |
|---|---|---|---|
| 4,738,741 A | | 4/1988 | McMichael |
| 5,039,389 A | | 8/1991 | McMichael |
| 5,470,448 A | * | 11/1995 | Molter et al. ............... 204/252 |
| 5,759,712 A | | 6/1998 | Hockaday |
| 5,879,828 A | * | 3/1999 | Debe et al. .................... 429/41 |
| 6,500,217 B1 | | 12/2002 | Starz et al. |
| 6,926,984 B2 | | 8/2005 | Asano et al. |
| 7,141,328 B2 | * | 11/2006 | Fukumoto et al. ............. 429/41 |
| 2002/0122972 A1 | * | 9/2002 | Klitsner et al. ................ 429/42 |
| 2002/0164513 A1 | | 11/2002 | Asano et al. |
| 2004/0096734 A1 | | 5/2004 | Calundann |
| 2004/0118773 A1 | | 6/2004 | Uensal et al. |
| 2005/0260474 A1 | | 11/2005 | Asano et al. |

FOREIGN PATENT DOCUMENTS

| | | |
|---|---|---|
| DE | 197 05 469 C1 | 10/1998 |
| DE | 100 46 388 A1 | 4/2001 |

(Continued)

*Primary Examiner*—Dah-Wei D Yuan
*Assistant Examiner*—Kwang Han
(74) *Attorney, Agent, or Firm*—Marshall & Melhorn, LLC

(57) ABSTRACT

The invention relates to a proton-conducting polymer membrane and to a method for the production thereof. Starting from a catalyst layer, which is homogeneously deposited on the polymer membrane (3), the catalyst layer is subdivided into a number of catalyst segments (1a, 1b) by microstructuring so that adjacent fuel cell units of a planar fuel cell arrangement can be realized in the smallest possible space.

14 Claims, 3 Drawing Sheets

FOREIGN PATENT DOCUMENTS

| | | |
|---|---|---|
| DE | 101 10 752 A1 | 9/2002 |
| DE | 102 01 691 A1 | 9/2002 |
| DE | 101 17 686 A1 | 10/2002 |
| EP | 0 275 465 B1 | 8/1992 |
| EP | 1 037 295 A1 | 9/2000 |
| WO | WO 96/24958 A1 | 8/1996 |

* cited by examiner

PROTON-CONDUCTING POLYMER MEMBRANE AND METHOD FOR THE PRODUCTION THEREOF TO SIMULTANEOUSLY REMOVE THE CATALYST LAYERS

BACKGROUND OF THE INVENTION

The present invention relates to a proton-conductive polymer membrane as well as to a method for its manufacture.

Fuel cell systems are becoming more and more important with regard to the supply of voltage for mobile electric and electronic apparatus. For achieving commercially common voltages, several fuel cells are connected in series for the addition of individual voltages. With a planar fuel cell arrangement, this is realised by way of connecting several fuel cell units arranged in a plane in series. Each fuel cell unit on the cathode and anode side in each case has a gas distribution structure and a diffusion layer. These two reaction spaces are separated by a membrane electrode assembly (MEA). This is a proton-conductive polymer membrane which is catalytically coated in the region of the reaction spaces. A known arrangement for the series connection of fuel cell units is the so-called strip membrane fuel cell. With this, a transverse conductor structure penetrates through the plane of the membrane and by way of this connects the cathode side of a first fuel cell unit to the anode side of the adjacent fuel cell unit. However the leading of the transverse conductor through the plane of the membrane quickly leads to leakage (unsealedness) of the fuel cell system.

For an improved sealing and for reasons of manufacturing technology, it is therefore advantageous to separate the reaction spaces of the anode side from the cathode side by way of a continuous polymer membrane which however still needs to have a catalyst coating in the region of the reaction spaces.

Polymer membranes are known for this, which are catalytically coated in segmented regions. At the same time, the catalyst layers may be deposited on the polymer membrane in segments by way of roller deposition or hot pressing. With these mechanical deposition methods, minimum distances of several millimeters (about 3 mm) are necessary between the individual adjacent catalyst segments in order to achieve a clear separation of the individual segments from one another. Additional problems arise due to the fact that the membrane is heated or deformed on deposition (e.g. by way of hot pressing), and thus an exact positioning of the catalyst segment and membrane is rendered more difficult.

One basic disadvantage of the known polymer membrane with catalyst segments is thus that due to the large minimum distances between the catalyst segments which must be maintained, surface area remains unused, which thus is no longer available for voltage production, in miniaturised planar fuel cells.

SUMMARY OF THE INVENTION

It is therefore the object of the present invention to make available a polymer membrane provided with catalyst segments, and a method for its manufacture, which renders the total area of the polymer membrane usable in an efficient as possible manner and thus to increase the efficiency, in particular of small-dimensioned planar fuel cell arrangements.

By way of the fact that with the method according to the invention, a catalyst layer deposited on the polymer membrane in a homogeneous manner is removed in regions for creating catalyst segments which are separated from one another by way of subtractive structurisation techniques, one may remove only very little of the present catalyst layer in an exact manner, in order thus to securely prevent an electrical contacting of catalyst segments lying next to one another which are located on the same side of a polymer membrane.

It is thus possible to reduce the distance between (e.g. rectangular) segments along any edge of these segments to below 1 mm, preferably to below 0.5 mm.

The invention may above all be applied to all membrane electrode assemblies (MEA) manufactured using common manufacturing processes. For this reason one may use a membrane electrode assembly which is particularly suitable for the specific case of application with regard to electrochemical activity, proton-conductivity, methanol permeation, etc., and which may be segmented by way of the method according to the invention.

This is also possible in a very economical manner. The known methods according to the state of the art with which a segmentation of the catalyst layer on a polymer membrane is possible entail considerable costs with regard to investment which in particular need to be carried out again with each design change. By way of the method according to the invention one may segment MEAs at a considerably lower cost since preferably only one working procedure (cycle) in a series compatible technology is present (see the dependent claims).

Advantageous further formations of the present invention are described in the dependent patent claims.

A particularly advantageous embodiment form envisages the regional [material] removal of the catalyst layer to be effected by way of reactive ion etching. This is possible in a commercially available plasma installation (e.g. Oxford Plasmalab 80 plus) with a mask which at locations has openings at which the catalyst layer is to be removed. If the [material] removal is only to be effected on one side, then under certain circumstances it is favourable to cool the opposite side of the polymer membrane. Basically however, a double-sided [material] removal of a polymer membrane coated on both sides is also possible in a single working procedure (cycle).

A further particularly advantageous further embodiment envisages the regional [material] removal of the catalyst layer to be effected by way of laser ablation. At the same time the parameters of the polymer membrane (material, thickness) and of the laser (intensity, wavelength) are preferably to be selected such that the polymer membrane has such a high transmission that a catalyst layer lying on both sides of the polymer membrane may be moved in regions on both sides by way of laser radiation on only one side of the coated polymer membrane. It is however of course also possible to set the method parameters such that the catalyst layer may only be removed on one side of the polymer membrane (e.g. if structures which differ slightly are to be manufactured on the opposite sides of the polymer membrane). Under certain circumstances, the addition of protective gas may be meaningful in order to prevent damage to the polymer membrane or the catalyst layer. Alternatively—and under certain circumstances, in a manner which is simpler with regard to method technology—it is also possible to cover the MEA with a transparent disk or film in order to stop the transport of oxygen.

Further advantageous methods envisage the regional [material] removal to be effected with common methods of microstructuring technology such as sputter-etching, ion-beam etching, reactive ion-beam etching, plasma etching, or barrel etching.

No limitations are made with regard to the catalyst layer. One may use commercially available finished (prefabricated) products, e.g. a Nafion® polymer membrane (other membrane materials are also possible, e.g. polyether ether-ketone (PEEK), PBI, PEEK with sulphonised co-polymer) with any catalyst layers. Usually these catalyst layers are highly porous and consist of precious metal particles (preferably Pt, Pt—Ru), graphite as well as a proton-conductive polymer.

The thickness of the unremoved homogeneous catalyst layer, which may be deposited on one side or on both sides of the polymer membrane before the regional [material] removal is preferably uniformly 5-10 µm.

A further advantageous further formation envisages a further layer to be deposited on that side of the catalyst layer which is distant to the polymer membrane. This e.g. is a diffusion layer which is deposited onto the catalyst layer or is connected to this. It is to be expressly pointed out that this additional layer does not limit the scope of the invention since this is also removed just as the catalyst layer lying therebelow with common techniques belonging to microstructuring technology.

A further advantageous further formation envisages the polymer membrane which is previously coated homogeneously and over the whole surface to be segmented in a two-dimensional manner such that various arrangements of catalyst segments result on it for respective individual fuel cell assemblies. Thus in this manner one may configure any type of field, such as N×M fields (N, M=integer and arbitrary) of rectangles/squares, triangles etc. At the same time it is important for optimal exploitation of the space that the minimum distance between the edges of these individual geometric figures must only be 0.5 mm or less. Of course however it is also possible to provide other geometric figures with edges which are not straight (oval shapes, circles, rounded figures, figures with rounded edges, etc.)

A further advantageous further formation envisages a complete [material] removal of the catalyst layer between the catalyst segments down to the polymer membrane. The individual catalyst segments are securely electrically insulated from one another by way of this. It is however also conceivable for the [material] removal of the catalyst layer not to be complete in the region between the catalyst segments. In this case it is to be taken care that the electrical resistance between two adjacent catalyst segments is high in comparison to the electrical resistance of the electrical connection lead between the two adjacent fuel cell units for the series connection of the fuel cell units so that only very low conduction losses set in due to leakage currents.

Further advantageous further formations envisage additional measures to be taken for preventing an ion flow between two adjacent fuel cell units which have adjacent catalyst segments. One may thus envisage the distance between the individual adjacent catalyst segments of two adjacent fuel cell units to be ten times larger than the thickness of the polymer membrane without the catalyst layer. The "shunt conductance losses" are minimised on account of this.

It is however also possible to prevent or halt the ion-conductivity of the polymer membrane by way of electrode etching or by way of local thermal treatment (e.g. by way of thermal treatment by way of laser, ultrasound welding, etc.).

The ion transport may also be prevented by way of partial hydrophobisation at the locations at which the catalyst layer is removed. A hydrophobic polymer (e.g. Teflon®) may be deposited by way of screen-printing for this purpose. The spray process is also possible as a deposition technique, wherein the catalyst segments are covered with a mask. The polymer is subsequently sintered locally by way of laser or plasma treatment.

Further advantageous further formations of the present invention are dealt with in the remaining dependent claims.

BRIEF DESCRIPTION OF THE DRAWINGS

The present invention is now illustrated by way of several figures. There are shown in FIG. 1a a cross section of a polymer membrane according to the invention, provided with catalyst segments on both sides, FIG. 1b an electrical circuit diagram of the arrangement shown in FIG. 1b, FIGS. 2 and 3 various embodiments of polymer membranes with catalyst segments in a plan view.

DESCRIPTION OF THE PREFFERED EMBODIMENTS

Figure 1A:
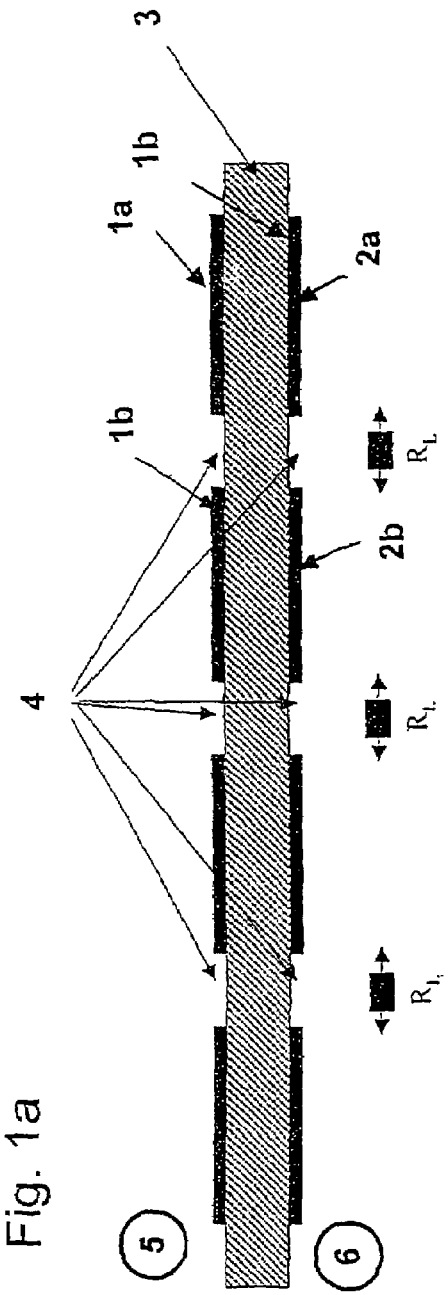

FIG. 1a shows a cross section through the polymer membrane 3 according to the invention, on whose upper and lower side catalyst segments are arranged in each case. These catalyst segments (1a, 1b, 2a, 2b) belong to adjacent fuel cell units (catalyst segment 1a and 2a form a fuel cell unit lying at the right edge in FIG. 1a, to the left next to this the fuel cell unit provided with the catalyst segments 1b and 2b). The polymer membrane 3 is of a proton-conductive polymer material (e.g. Nafion®). It is an electrical insulator. The layer thickness of the respective catalyst segments 1a, 1b, 2a, 2b is uniformly between 5 and 10 µm.

The polymer membrane shown in FIG. 1a with catalyst segments originates from a polymer membrane which has been previously provided on the upper and lower side with continuous, homogeneous catalyst layers of a constant thickness, wherein in the intermediate regions 4, the catalyst layer has been removed with one of the methods cited above (thus by way of reactive ion etching, laser ablation, sputter etching, ion-beam etching, reactive ion-beam etching, plasma etching or barrel etching. With regard to the details of these methods, the introduction of the description is referred to in its complete scope).

The catalyst layer may, as already initially described, be of any common material. It is generally highly porous and is of precious metal particles (Pt, Pt—Ru etc.), graphite and a proton-conductive polymer. Alternatively, for finely distributing e.g. oxygen and molecular hydrogen onto the catalyst segments, one may yet additionally deposit a diffusion layer on all catalyst segments in each case on the side which is distant to the polymer membrane. It is thus also possible with an MEA with which a diffusion layer has already been deposited—e.g. pressed on, to also structure this diffusion layer in the manner according to the invention.

The individual fuel cell units (formed e.g. of 1a, 2a as well as lying next to these 1b, 2b) are connected electrically to one another in series in a manner which is not shown. Thus e.g. on the cathode side 6, the catalyst segment 2b is electrically connected to the catalyst segment 1a on the anode side 5 (see also FIG. 1b).

The intermediate regions 4 in the horizontal direction (thus at a distance between 1b and 1a or 2b and 2a in each case have a distance which is smaller than 0.5 mm, preferably smaller than 0.3 mm so that the distance of these catalyst segments perpendicular to the sheet of the plane (i.e. plane of the membrane) is preferably not larger than this distance.

In the present case the catalyst layer has been completely removed in the intermediate regions 4. For this reason the electrical resistance between adjacent catalyst segments 1b and 1a (the resistance $R_L$) is extremely high. The resistance has a tendency to increase with a larger distance of the catalyst segments from one another. Here one should take note of a suitable moisture management on operation of the fuel cell units since under certain conditions due to fluids, the resistance between adjacent catalyst segments on the same side of the polymer membrane is reduced and leakage currents may increase on account of this. For this it is also favourable in the region between the catalyst segments 1b and 1a to carry out hydrophobisations in order to reduce corresponding losses.

It is however also possible for the [material] removal of the catalyst layer to be effected in a complete manner in the intermediate region 4 between the catalyst segments 1a, 1b.

Figure 1B:
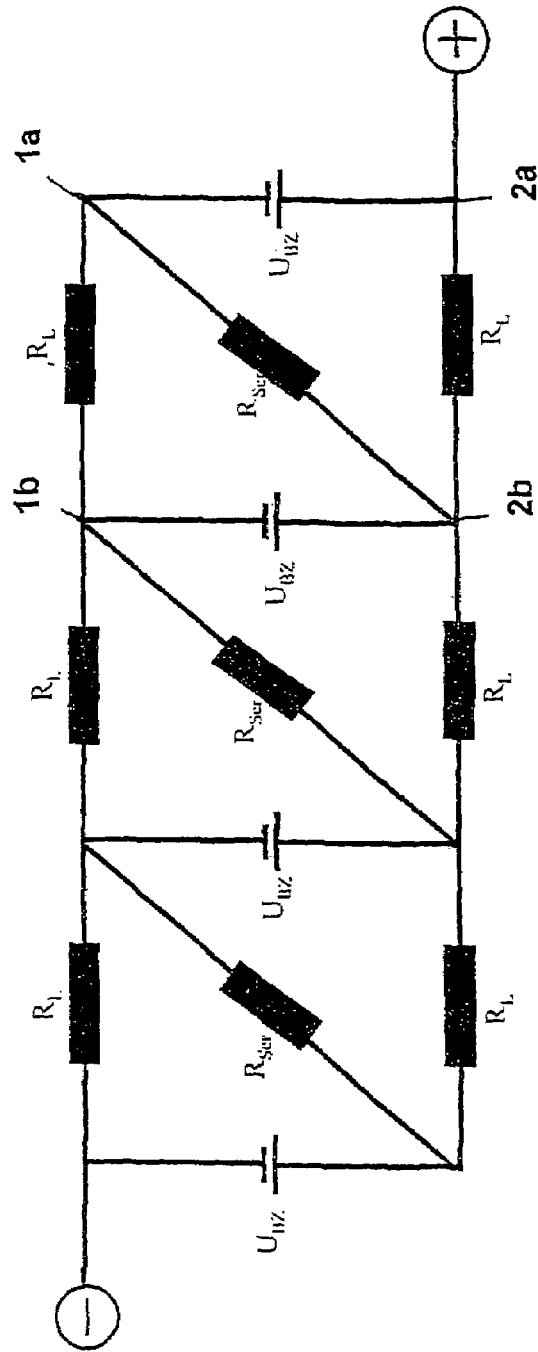

An electrical equivalent circuit diagram belonging to FIG. 1a is shown in FIG. 1b. In the planar fuel cell units shown in FIG. 1a, their series circuiting is realised in that the cathode side (thus on side 6) is electrically connected to the anode side (thus side 5) of the next fuel cell unit outside the reaction space. The electrical resistance of this contacting is indicated at $R_{ser}$. The electrical resistance between two adjacent catalyst segments via which leakage currents may flow is indicated at $R_L$.

Each fuel cell unit delivers a voltage $U_{BZ}$. By way of the series connection, these individual voltages are added and are tapped at the ends (indicated at "+" and "−" in FIG. 1b). The desired current direction runs between these two ends through each of the fuel cell units (formed of 1a, 2a; 1b, 2b etc.) and the series resistances $R_{ser}$. So that only minimal leakage currents flow between adjacent segments, the leakage resistances $R_L$ would have to be very much larger than the series resistances $R_{ser}$ (condition $R_{ser} \ll R_L$). For this reason the catalyst layer between the segments should be removed as completely as possible down to the polymer membrane, by which means the segments are completely insulated from one another.

A residual layer of the catalyst may remain. On etching, under certain process conditions, individual islands of remaining material are formed which electrically are partly insulating or electrically are no longer connected to one another. Thus one already obtains a large insulation resistance $R_L$ although not all material has been removed.

Here $R_{ser}$ is e.g. approx. 1 . . . 4 Ohm cm$^2$, $R_L$ should be approx. 1000 times larger (example: $R_L$=2000 Ohm is required: with a cell area of 1 cm$^2$, 200 μm gap width, the surface resistance in the etched region must be 100 kOhm/cm$^2$. If one etches less away and finishes at 20 kOhm/cm$^2$, then the minimum distance must be accordingly 1 mm wide. If the cell surface is not square but e.g. 0.5×2 cm$^2$, the gap length is thus 2 cm, then with a surface resistance in the etched region of 100 kOhm/cm$^2$ the gap width must be 400 μm.

It is furthermore advantageous to remove the catalyst layer in the edge regions and around the openings of the MEA. This on the one hand is advantageous since with possible leakage, exiting hydrogen gas or entering air may ignite the membrane. By way of the material removal of the catalyst layer in these regions, the danger of ignition in the case of a leakage may be reduced.

Openings are incorporated into the MEA as an inlet and outlet for the reactants into the reaction space, wherein the flow direction in the region of the opening is mostly perpendicular to the plane of the MEA. One may thus save space in contrast to a lateral inlet and outlet into the reaction space. For this purpose, one mostly uses openings in the MEA and it is therefore advantageous in the case of leakages to remove the catalyst layer in the edge regions of these openings.

Secondly, by way of surface treatment by way of plasma etching and possibly also laser treatment, one may improve the bonding properties. This is a common method for improving the bonding properties (increasing the surface energy) of flour polymers. Then either the bonding property of the catalyst layer in which the proton-conductive polymer has been incorporated (according to today's state of the art these are often fluidised and sulphonsied co-polymers) or in the case of a complete etching of the catalyst layer, the bonding property of the membrane surface is improved.

Figure 2:
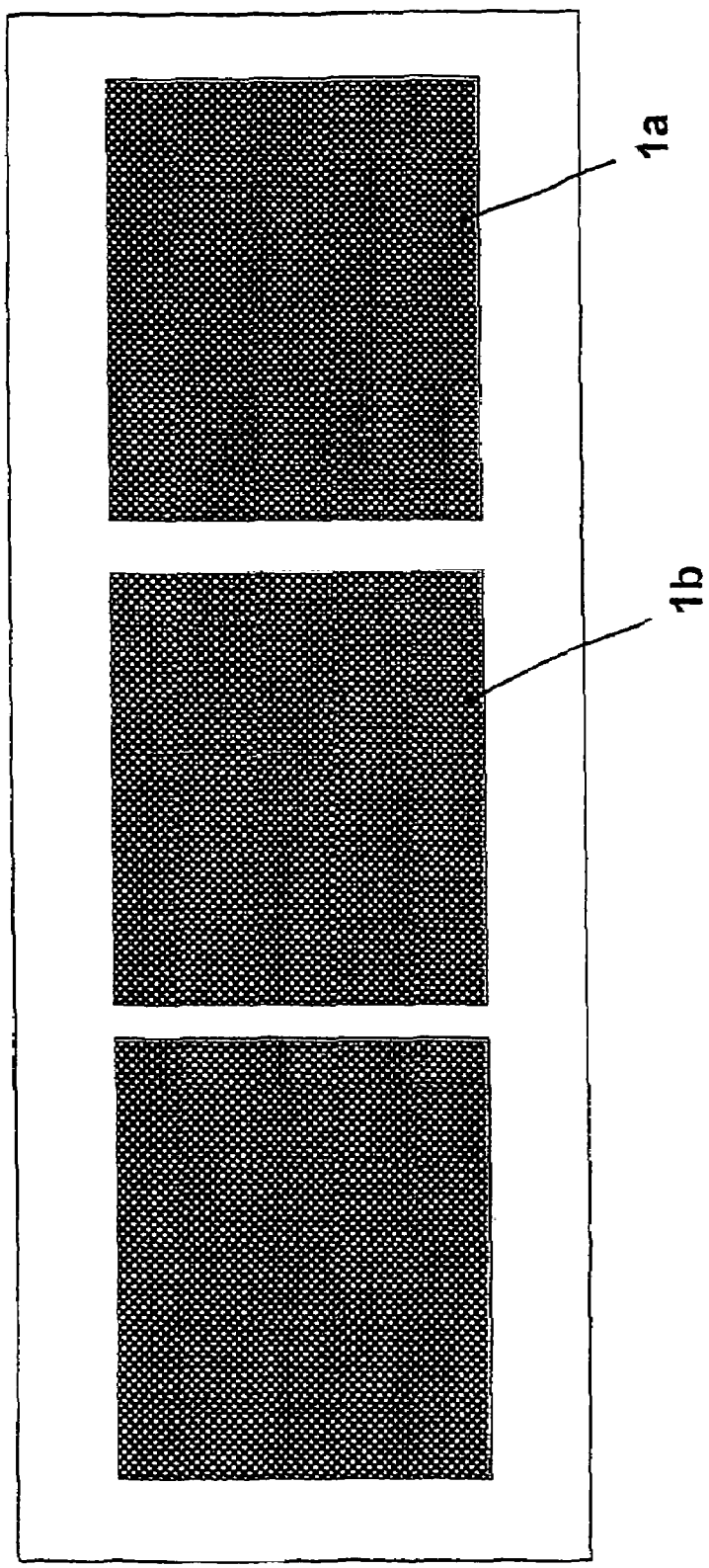
Figure 3:
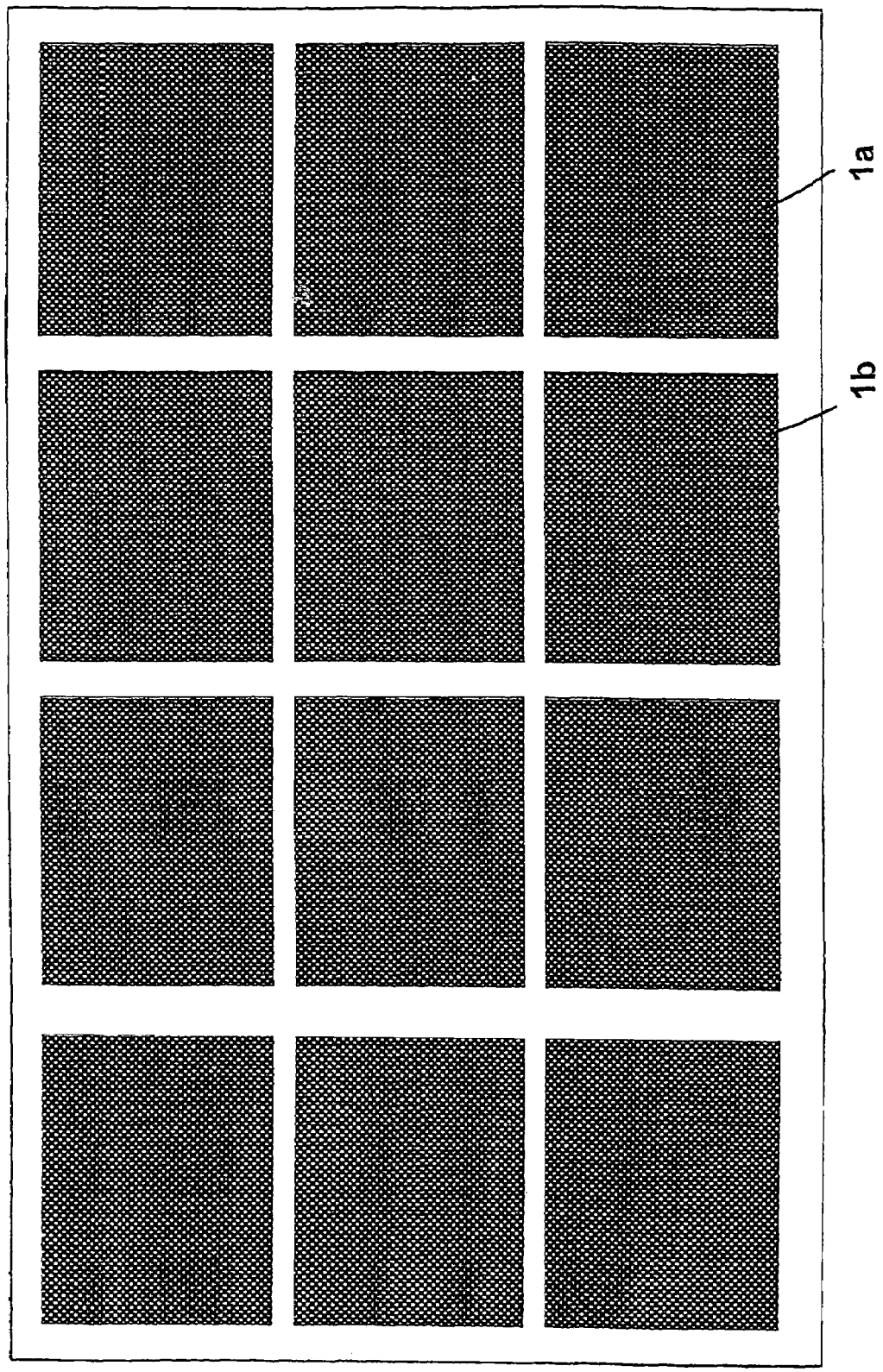

For this reason it is advantageous to carry out the surface treatment of the MEA in the edge regions and around the openings. With this, FIG. 2 shows a 3×1 field of catalyst segments, FIG. 3 shows a 3×4 field of catalyst segments. All of the rectangular catalyst segments at the same time represent a surface in each case of various fuel cell units which are connected in series with one another.

The invention claimed is:

1. A method for manufacturing a polymer membrane with catalyst layers on both of two sides in regions, wherein:
   each of the catalyst layers is deposited homogeneously on each of the two sides of the polymer membrane; and
   the catalyst layers are removed in regions simultaneously on both sides by means of laser radiation incident only on one of the two sides of the polymer membrane to create catalyst segments which are separated from one another.

2. A method according to claim 1, wherein the catalyst layers are porous and comprise precious metal particles, graphite as well as a proton-conductive polymer.

3. A method according to claim 1, wherein the thickness of the homogeneous catalyst layers which have not been removed is 5-10 μm before the regional removal.

4. A method according to claim 1, wherein a further layer is deposited on those sides of the catalyst layers which are distant to the polymer membrane.

5. A method according to claim 1, wherein the catalyst segments which are separate from one another in each case represent catalyst surfaces of two adjacent fuel cells of a planar fuel cell arrangement.

6. A method according to claim 1, wherein at least three separate catalyst segments are provided which form a two-dimensional field of fuel cells of a planar fuel cell arrangement.

7. A method according to claim 1, wherein a complete removal of the catalyst layers is effected in the region between the catalyst segments.

8. A method according to claim 1, wherein the removal of the catalyst layers is not completely effected in the region between the catalyst segments.

9. A method according to claim 1, wherein the distance between the individual catalyst segments is 10 times larger than the thickness of the polymer membrane without catalyst layers.

10. A method according to claim 1, wherein the ion conductivity of the polymer membrane is reduced or stopped by way of electrode etching or by way of local thermal treatment.

11. A method according to claim 1, wherein a hydrophobisation is effected in the regions of the removed catalyst layers.

12. A planar microfuel cell arrangement containing a coated polymer membrane manufactured according to claim 1.

13. A proton-conductive polymer membrane which on both of two sides is provided with catalyst layers, each of which consists of at least two catalyst segments which are separate from one another on the surface, wherein the distance of these catalyst segments is smaller than 0.5 mm, and wherein a transmittance of the polymer membrane is sufficiently high so that the catalyst layers can be simultaneously removed on both of its sides by means of laser radiation incident only on one side of the polymer membrane.

14. A planar microfuel cell arrangement, containing a proton-conductive polymer membrane according to claim 13.

* * * * *